US006382235B1

(12) United States Patent
Drube et al.

(10) Patent No.: US 6,382,235 B1
(45) Date of Patent: May 7, 2002

(54) DEVICE FOR OVER-PRESSURE PROTECTION FOR A STORAGE TANK

(75) Inventors: Thomas K. Drube, Lakeville; Brian P. Bostrom, Minneapolis; Kristy M. Malecha, New Prague; Matthew D. Sasse, Eden Prairie, all of MN (US)

(73) Assignee: Chart Industries, Inc., Burnsville, MN (US)

( * ) Notice: Subject to any disclaimer, the term of this patent is extended or adjusted under 35 U.S.C. 154(b) by 0 days.

(21) Appl. No.: 09/785,713

(22) Filed: Feb. 16, 2001

(51) Int. Cl.[7] ............................................. F16K 17/194
(52) U.S. Cl. .............................. 137/115.14; 137/115.24
(58) Field of Search ........................ 137/115.02, 115.04, 137/115.14, 115.15, 115.24, 116.3

(56) References Cited

U.S. PATENT DOCUMENTS

| | | | | |
|---|---|---|---|---|
| 333,403 A | * | 12/1885 | Fitts ...................... | 137/115.14 |
| 1,288,578 A | | 12/1918 | Hatfield et al. | |
| 1,628,698 A | * | 5/1927 | Walker .................. | 137/115.24 |
| 2,928,410 A | * | 3/1960 | Del Vecchio .......... | 137/115.02 |
| 3,774,628 A | | 11/1973 | Norton et al. | |
| 3,904,175 A | * | 9/1975 | Deschenes .............. | 137/116.3 |
| 4,171,004 A | * | 10/1979 | Cerrato et al. ......... | 137/115.14 |
| 4,171,708 A | | 10/1979 | Pareja | |
| 4,244,388 A | | 1/1981 | Feiss | |

OTHER PUBLICATIONS

Compuressed Gas Association, *Protection of Cryogenic Storage Tanks from Overpressure During Operator–attended Refill*, 1997, pgs. 1–4.
Compressed Gas Association, *Incident Repoting Quarterly*, 1999, pgs. 1–2.
MG Industries, *Bulk Nitrogen Tank Failure and Fatality*, 1997, pgs 8–2–8–12.
Industrial Gases, Counsil, *Prevention of Excessive Pressure in Cryogenic Tanks During Filling*, 1997, pgs. 2–12.
Bestobell Valves, *Automatic Shut Off Valve*, 19?, pgs. 1–4.

* cited by examiner

*Primary Examiner*—Stephen M. Hepperle
(74) *Attorney, Agent, or Firm*—Piper Marbury Rudnick & Wolfe

(57) ABSTRACT

A device for over-pressure protection of a tank has a main body defining a main passage with an inlet and an outlet. The main body also defines a release passage branched from the main passage. A shut-off mechanism is movably disposed within the main passage and defines an open position for allowing a liquid to flow from the inlet to the outlet and a closed position for at least partially blocking the flow. Additionally, a plunger is movably disposed within the main body and connects to the shut-off mechanism. The plunger has a weight sufficient to maintain the shut-off mechanism in the open position until pressure in the release passage exceeds a predetermined value.

10 Claims, 4 Drawing Sheets

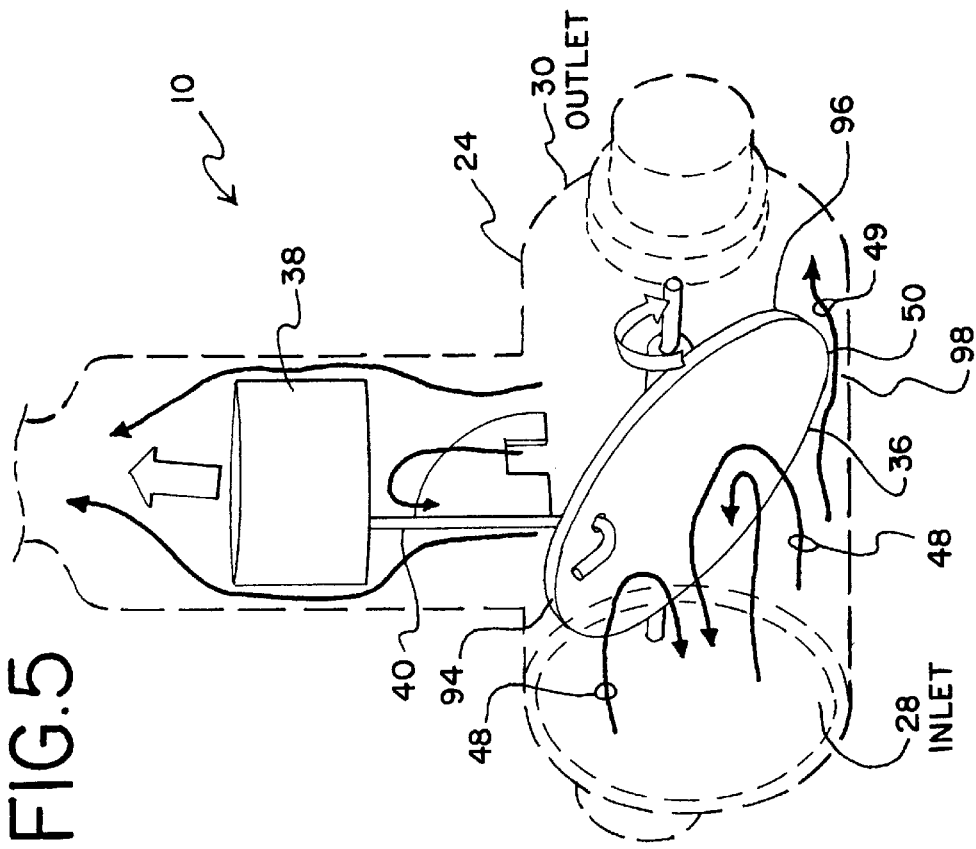
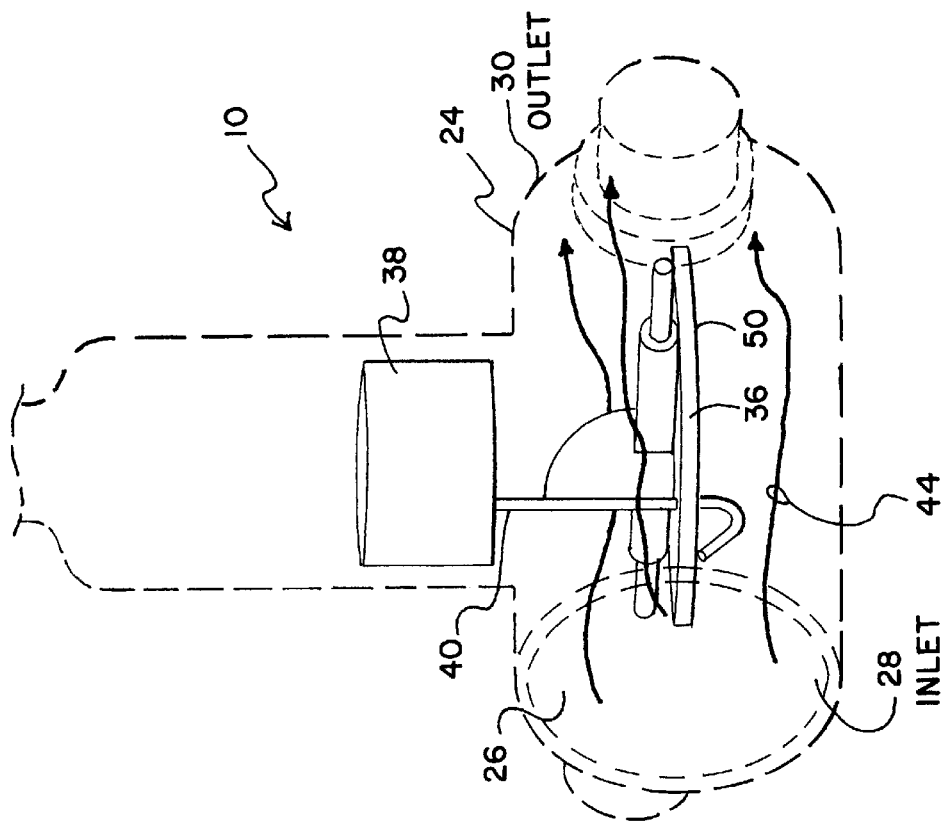

DEVICE FOR OVER-PRESSURE PROTECTION FOR A STORAGE TANK

BACKGROUND

The present invention relates generally to the filling of storage tanks, and more particularly to a device that prevents over-pressurization of storage tanks while filling the tanks with cryogens from a transportable supply tank that uses a high flow and high pressure pump.

In the field of cryogenics, an operator connects a transport or supply tank on a tank truck to a feed, fill or distribution line for filling a stationary storage or receiver tank. A transport pump used to fill the storage tank, typically a centrifugal pump, is connected along the distribution line and is typically mounted on the truck itself. The cryogen exits the storage tank through a supply pipe extending from the storage tank to a facility for use or further distribution of the stored cryogen.

During filling of the storage tank through the fill line, a working pressure must be maintained in order to prevent a detrimental change in the pressure of the cryogen in the supply pipe. This requires that the pump maintain at least the working pressure as well as provide extra pressure to overcome the frictional pressure drop of the cryogenic fluid flowing to the storage tank. To ensure acceptable pressure in the tank, the operator must monitor the filling process to maintain a steady pressure for filling.

Since the centrifugal pumps have high flow and pressure capability, the pumps can easily exceed the allowable working pressure and the upper pressure limit of the storage tanks. Accidents may occur if the safety valves on the storage tank malfunctions and the filling process is not being monitored properly.

The Industrial Gases Council (IGC) established standards in "Prevention of Excessive Pressure in Cryogenic Tanks During Filling," and the Compressed Gas Association (CGA) established a position statement PS-8-1997 entitled "Protection of Cryogenic Storage Tanks from Overpressure During Operator-attended Refill." These standards were developed to recommend proper high flow filling procedures and requirements for the feed lines for the tanks.

In response, some gas producers use analysis of an extensive database to ensure the safety of tank truck fleets and storage tanks. The database contains specifications including pressure capacities and pressure test results for each component on each fill system. This type of data system either deems that fill lines and circuits are safe or adds restrictions to certain fill lines and circuits to make them safe. This requires enormous amounts of data management for pressure calculations such that smaller operations may not be able to afford this option. Further, the analysis must include both tank truck and storage tank data. Changes to either can undermine the data since it requires recalculating the pressure requirements for the modified systems. The database management system also limits the pump performance and increases cost delivery when a storage tank is rated in a way that requires the feed pump to be operated at less than full capacity. Finally, since the database systems are merely a preventative measure and no automatic shut-valve is added to these systems, an upset or overfill event potentially permits the contents of the supply tanks to be emptied and pooled on the ground.

Instead of such an expensive monitoring system, another known system uses a fill termination device (shut-off valve) to control the pressure to the storage tanks. The shut-off valve is an expensive, large and heavy 1½" globe valve attached near the inlet to the storage tank and directly to the feedlines. A sensor plumbed to the top of the storage tank sends a signal to a motor on the globe valve automatically actuating it upon detecting a threshold pressure. Specifically, the globe valve has a spring-tripped release to close the valve and stop the flow that is triggered when the pressure in the storage tank is greater than the working pressure for that specific storage tank. This type of valve does not allow liquid to pool during an overfill since it does not have an opening to release the flow.

This conventional fill termination device, however, will completely shut off the flow when threshold pressures are reached in the storage tank without also immediately turning off the pump supplying the cryogen, which can dead-head the pump. Dead-heading occurs when cryogen flowing near its boiling temperature is stopped in the pump while the pump blades are still turning, which further warms the cryogen and converts it to a gas. Rotating the pump blades through the gas increases the RPMs to dangerous levels causing wear or damage to the pump.

Dead heading the pump can be avoided by providing a bypass loop that includes a return line leading back to the supply tank or supply vehicle in order to keep the flow moving until the pump can be turned off. This configuration, however, can be even more expensive since it requires a second line and more complicated valve system equipment to be placed on each tanker vehicle.

Lastly, other known automatic shut-off valves have complicated mechanisms for shutting-off the flow, usually utilizing springs, balls or other moving parts that are difficult to produce, wear quickly with use and require frequent maintenance.

Accordingly, it is a main object of the present invention to provide an improved device for over-pressure protection of storage tanks that inexpensively and effectively prevents damage to storage tanks and harm to operators when a high flow, high pressure pump is used to fill a storage tank.

More specifically, an object of the present invention is to provide an improved device for over-pressure protection of storage tanks that effectively shuts-off flow to a storage tank and releases pressure when a threshold pressure is reached in the tank without dead heading a pump supplying the flow.

An additional object of the present invention is to provide an improved device for over-pressure protection of storage tanks that automatically shuts-off the flow to a storage tank without the need for constant monitoring of the pressure during a filling process.

A further object of the present invention is to provide an improved device for over-pressure protection of storage tanks that effectively shuts-off the flow to the storage tank without dangerously pooling the flow when release of pressure is required.

Yet another object of the present invention is to provide an improved device for over-pressure protection of storage tanks that is inexpensive, easy to maintain and will not require frequent replacement due to wear.

These and other objects of the present invention are discussed or will be apparent from the detailed description of the invention.

SUMMARY OF THE INVENTION

In keeping with one aspect of the present invention, a device for over-pressure protection of a storage tank provides a plunger and shut-off mechanism that automatically shuts-off flow during over-pressure situations and automatically resets when the pressure drops back to normal operating levels. The shut-off mechanism is configured to maintain some flow to prevent dead heading of a pump providing the flow. Also, the plunger and shut-off mechanism are easy to assemble and maintain.

More specifically, a device for over-pressure protection of a tank has a main body defining a main passage with an inlet and an outlet. The main body also defines a release passage branched from the main passage. A shut-off mechanism is movably disposed within the main passage and defines an open position for allowing a substance to flow from the inlet to the outlet and a closed position for at least partially stopping the flow. Additionally, a plunger is movably disposed within the main body and connects to the shut-off mechanism. The plunger has a weight sufficient to maintain the shut-off mechanism in the open position when the plunger receives less pressure than a predetermined amount of pressure from the flow. The plunger also has a weight sufficient to move the shut-off mechanism into the closed position when the plunger receives pressure at or above the predetermined amount of pressure.

In keeping with another aspect of the present invention, the shut-off mechanism in the over-pressure protection device is configured to block most of the flow while simultaneously directing over-pressured flow coming back from the storage tank toward a release passage for relief of the pressure. In more detail, a device for over-pressure protection of a tank has a main body defining a main passage with an inlet and an outlet. The main body also defines a release passage branched from the main passage. A shut-off mechanism is movably disposed within the main passage and is movable from an open position that permits all flow from the inlet to reach the outlet. The shut-off mechanism also defines a closed position that blocks most, but not all, of the flow entering the inlet from reaching the outlet while simultaneously directing flow from the outlet to the release passage.

BRIEF DESCRIPTION OF THE DRAWINGS

The above mentioned and other features of this invention and the manner of obtaining them will become apparent, and the invention itself will be best understood by reference to the following description of a preferred embodiment of the invention in conjunction with the drawings, in which:

FIG. 4 is a transparent, close-up, three-dimensional side perspective view of a portion of the over-pressure protection device of the present invention depicting the internal components of the device;

FIG. 5 is another transparent, close-up, three-dimensional side perspective view of a portion of the over-pressure protection device of the present invention depicting the internal components of the device;

DETAILED DESCRIPTION

Figure 1:
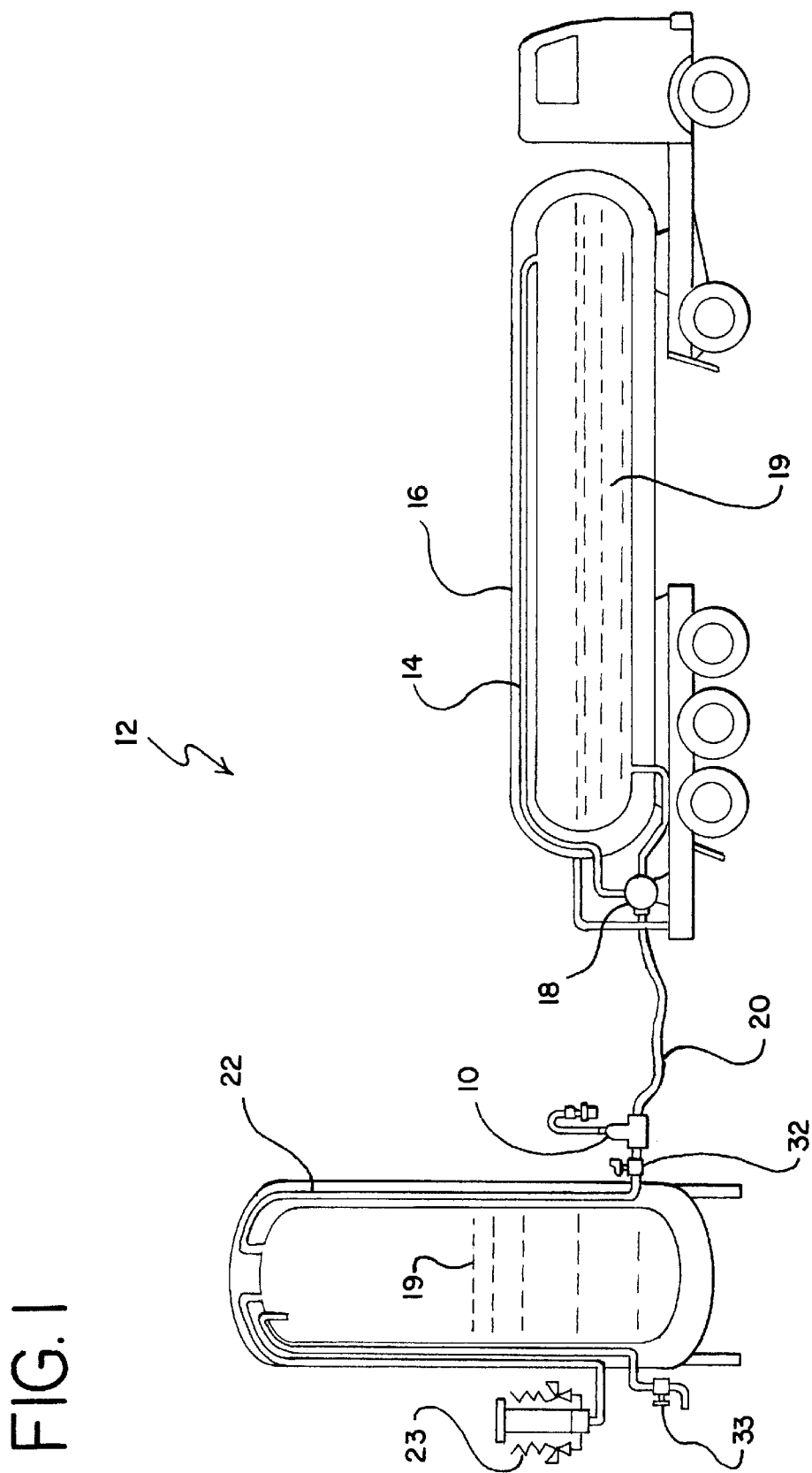
FIG. 1 is a simplified elevational diagram depicting the fill system of the present invention.

The above-listed objects are met or exceeded by the present device for over-pressure protection of a storage tank. Referring to FIG. 1, a stationary over-pressure protection device 10 is a component of a fill system generally designated 12. The over-pressure protection device 10 is preferably permanently located at each storage tank site (as shown in FIG. 1). The fill system 12 includes a transportable supply tank 14 on a truck 16 that also has an onboard high pressure, high volume, centrifugal transport pump 18. The pump 18 runs a substance 19, such as a cryogenic liquid, from the supply tank 14 through a feed or supply line 20, through the over-pressure protection device 10 and into a storage tank 22. The storage tank 22 has relief valves 23, an inlet 32 for filling and an outlet 33 for delivering the stored substance for use. In an alternative, the pump 18 may be a stationary pump located by the storage tank site 22 rather than onboard the truck 16.

Figure 3:
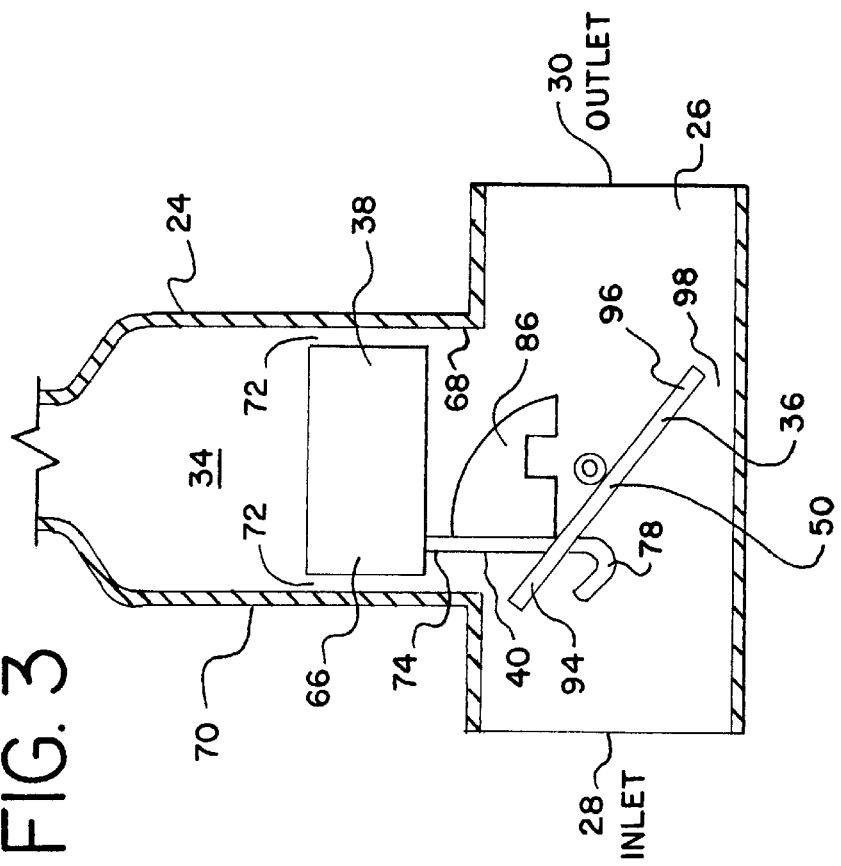
FIG. 3 is a longitudinal, cross-sectional, side view of the over-pressure protection device.
Figure 2:
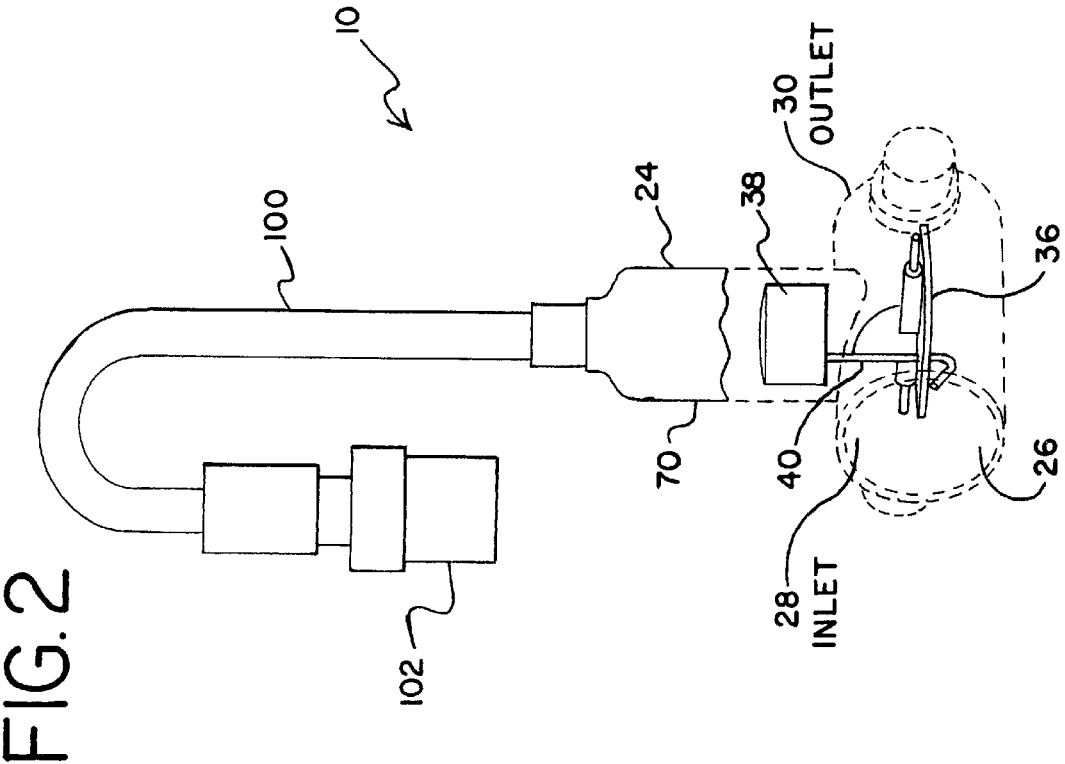
FIG. 2 is a transparent three-dimensional side perspective view of the over-pressure protection device of the present invention showing the internal components of the device.

Referring now to FIGS. 2–3, the over-pressure protection device 10 has an inverted T-shaped, main body 24 made, preferably, of stainless steel by methods known in the art. The main body 24 defines a horizontal main passage 26. The main passage 26 has an inlet 28 connected to the feed line 20 and an outlet 30 connected to the inlet 32 on the storage tank 14 (shown in FIG. 1). The overall length of the body 24 from inlet to outlet is relatively short for compatibility with many different existing systems.

The main body 24 also defines a vertical release passage 34 branched from the main passage 26 and extending upwardly as the central leg of the T-shaped main body 24. It will be appreciated that the main body 24 can take other shapes rather than the inverted T-shape and still remain within the scope of the present invention, such as a Y-shape where the release passage is inclined relative to the main passage. The two passages typically come in sizes of 1½" PS and 1" PS, respectively (standard sizes).

Referring to FIGS. 3–5, a shut-off mechanism 36 is movably disposed within the main passage 26 and is driven by a plunger or piston head 38 through a connecting rod 40. The shut-off mechanism 36 has an open horizontal position (shown in FIG. 4) to allow a cryogen to flow from the inlet 28 to the outlet 30 and a closed inclined position (FIG. 5) for releasing pressure and at least partially stopping the flow of cryogen as shown by arrows 48.

Figure 6:
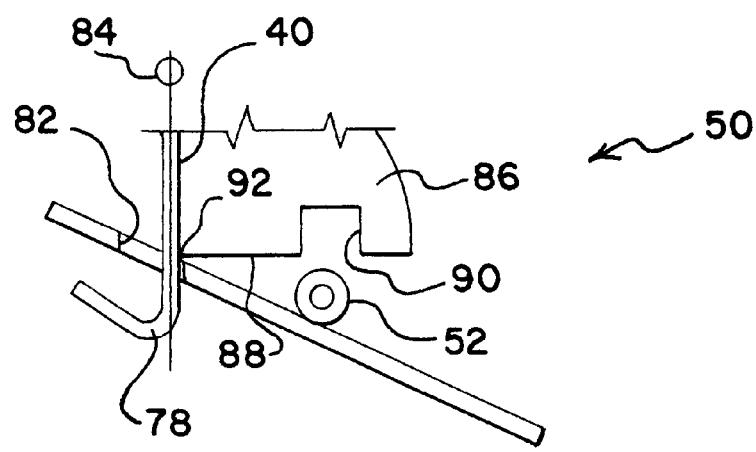
FIG. 6 is a close-up, side view of the internal components of the over-pressure protection device of the present invention.
Figure 7:
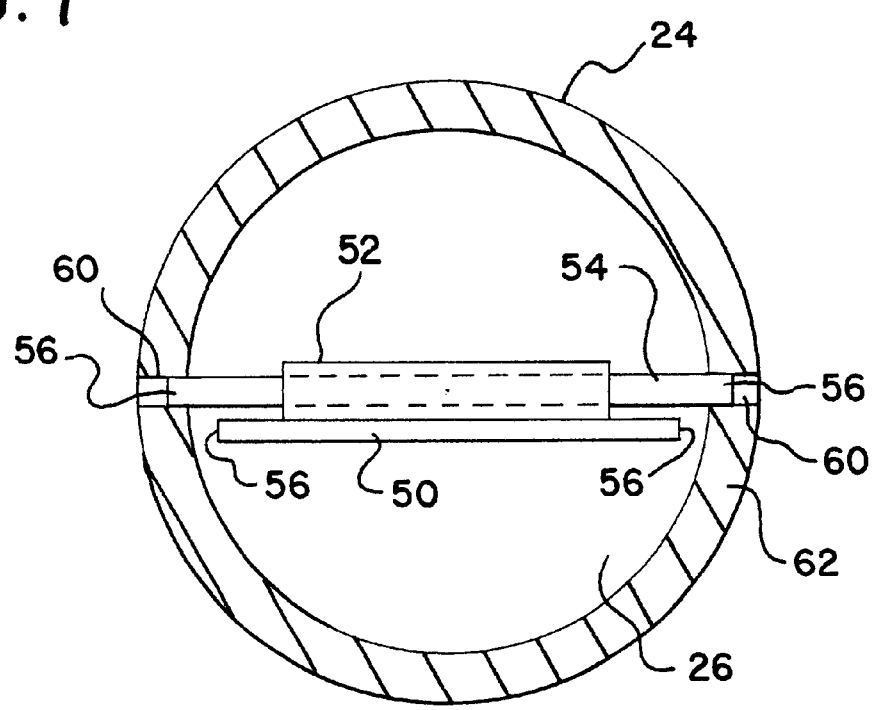
FIG. 7 is an elevational, transverse, cross-sectional view of a portion of the over-pressure protection device of the present invention.

Referring to FIGS. 5 and 7, the shut-off mechanism 36 includes a generally oval or circular plate or paddle 50 with an integrally formed diametrically extending roller 52 rotatably mounted on a pin 54 having ends 56. The pin 54 is longer than the roller and the transverse diameter of the paddle 50 so that the ends 56 of the pin are diametrically opposed and extend radially from a peripheral edge 58 of the paddle 50 (best seen in FIG. 6). It will be appreciated that the roller 52 may be welded to the paddle 50 rather than integrally formed with it. It will also be appreciated that many other pivot or slide mechanisms can be used to rotatably mount the paddle 50 in the main passage 26.

In the preferred embodiment, and as viewed in FIGS. 3 and 5 where the paddle 50 is shown in the closed position, an upper side 94 of the paddle 50 is longer than a shorter, more circular, lower side 96 so that the upper side completely blocks the flow of the substance at the top (arrow 48) but a gap 98 is created between the lower side 96 and a cylindrical wall 62 defining the main passage 26. This configuration provides for a less turbulent flow to the release passage 34. It will be appreciated, however, that other shapes for the paddle 50 can be used, such as a small diameter circular plate or other non-circular or non-oval shapes, as long as most of the flow can be blocked.

Referring to FIG. 7, when the device 10 is assembled, the pin ends 56 are secured within corresponding apertures 60 that are defined by the cylindrical wall 62 in the main body 24 and plugged after insertion of the pin. The apertures 60 are generally diametrically opposed and extend radially into the cylindrical wall 62. The apertures 60 are preferably disposed at the intersection 64 (shown on FIG. 3) of the main passage 26 and the release passage 34 so that the paddle 50 rotates within the intersection.

It will be appreciated that instead of a roller and pin structure, other structures within the scope of the present invention will rotate the paddle 50 as well, such as having the pins integrally formed or welded to the panel and free to rotate within the apertures 60 instead.

Referring again to FIG. 3, the plunger 38 has a preferably stainless steel, solid cylindrical body 66 that fits within the release passage 34. The release passage 24 is defined by a cylindrical interior surface 68 of a tubular wall 70 of the main body 24. A diameter of the plunger transverse to the direction of flow in the release passage 34 is preferably uniformly smaller than a diameter of the interior surface 68 to maintain a constant gap 72 between the interior surface and the plunger. The gap 72 is provided for the substance to flow around the plunger 38 and through the release passage 34.

The weight of the plunger 38 corresponds to the anticipated turbulence in the flow through the main passage 24, so that the plunger 38 is sufficiently heavy to maintain the shut-off mechanism 36 in the open position of FIG. 4 and sufficiently light to pull the shutoff mechanism 36 to the closed position 46. For a cryogenic liquid such as nitrogen, and for a flow rate of 100 Gall/mn, the plunger is preferably 5–7 oz. The weight of the plunger is calculated by a trial and error method until a balance between pressure and weight of the plunger for a particular liquid is obtained. Factors include viscosity of the liquid, flow rate and plunger configuration.

Referring to FIGS. 3 and 6, an upper end 74 of the connecting rod 40 is welded to, or integrally formed with, the bottom of the plunger 38 at a non-central location on the bottom and vertically aligned with the location where the connecting rod 40 attaches to the paddle 50. A lower end of the connecting rod 40 has a hook 78 received by a radially extended slot 82 also defined at a non-central location on the paddle 50. Slot 82 is used instead of a round hole to accommodate the sliding action of the rod 40 and hook 78 through the paddle 50.

Referring to FIG. 6, the connecting rod 40 generally defines a longitudinal axis 84 and has a fin 86 extending laterally relative to the axis. The fin 86 has a lower edge 88 for matingly engaging the paddle 50 and a preferably square cut out 90 at the edge 88 for first avoiding and then engaging the roller 52 when the plunger forces the connecting rod 40 toward the shut-off mechanism 36.

In operation, once the feed line 20 is connected to the storage tank 22 and supply tank 14 and the appropriate valves are opened, the pump 18 is turned on and a cryogenic substance 19 or other pressurized liquid flows from the supply tank, through the pump 18 and through the over-pressure protection device 10. When the over-pressure protection device is not completely filled below the plunger 38 or when the plunger receives hydraulic pressure from a substance flowing through the device 10 that is less than a predetermined maximum pressure of the storage tank 22, the plunger 38 is biased by gravity downwardly within the release passage 34 and toward the main passage 26. This action pushes the connecting rod 40 downwardly so that it slides through the slot 82 until an end 92 of the lower edge 88 of the fin 86 that is directly attached to the connecting rod 40, engages the paddle 50 (as shown in FIG. 6). The fin 86 pushes the paddle 50 (shown here in a counterclockwise motion) until the entire length of the lower edge 88 of the fin 86 engages the panel, which secures the panel in a horizontal or open position. It will also be appreciated that the friction of the rod 40 sliding against the slot 82 can be used to rotate the paddle 50.

Once in the open position, the fin 86 stops the connecting rod 40, and in turn the plunger 38, from moving downwardly any further and prevents the paddle 50 from further counterclockwise rotation. In the open position, the shut-off mechanism 36 provides a very thin profile so that the cryogen flows relatively unobstructed from the inlet to the outlet (as shown by arrow 44).

The paddle 50 is held in the open position until hydraulic pressure from the cryogen flowing in the release passage 34 provides enough force to overcome the downward force of the plunger's weight and moves it upwardly. This occurs when other release valves on the storage tank 22 malfunction and do not release any over-pressure, which causes back pressure from the storage tank 22 and into the outlet 30 of the over-pressure protection device 10. The hydraulic forces within the release passage 34 press upwardly against the bottom of the plunger 38 and/or run through gap 72 which entrains the plunger upward. As mentioned above, the weight of the plunger 38 is set so that the pressure must be higher than a predetermined amount of pressure in order to raise the plunger 38.

When the plunger 38 is moved upward, the connecting rod 40 is also pulled upward so that it slides through the slot 82 on the paddle 50 until the hook 78 engages the panel. From that point on, the continuing upward motion of the plunger 38 and connecting rod 40 pulls side 94 of the paddle 50 upwardly and rotates the paddle 50 clockwise. As the paddle 50 rotates and increasingly blocks the flow from the inlet 28, the inclined position of the panel increasingly permits backflow into the release passage 34. The backflow applies hydraulic pressure to the bottom 76 of the plunger 38, flows around the plunger 38 and flows through the release passage 34 for relief or expulsion.

The paddle 50 is rotated until the opposing pressure and weight forces are in equilibrium or until the connecting rod 40 and paddle 50 are fully extended so that the paddle 50 anchors the plunger 38 within the release passage 34 (as shown in FIG. 5). In this position, the paddle 50 is preferably slightly inclined from vertical with its upper side 94 leaning toward the inlet 28 for defining the closed position 46.

In the closed position, the paddle 50 blocks most of the flow (as shown by arrows 48) while still permitting some of the liquid 19 to flow past the panel toward the outlet 30 (as shown by arrow 49). Simultaneously to the blocking action, since the upper side 94 of the paddle 50 is inclined toward the inlet 28, the incline directs the high-pressured backflow from the outlet 30 upward toward the release passage 34 and against the plunger 38.

The liquid that flows past the plunger 38 through gap 72 runs through a candy cane shaped pipe 100 and into relief valve 102. The relief valve 102 is set to release a spray of the liquid 19 only when a pre-determined threshold pressure or trigger point is reached. An ASME coded standard valve can be used as valve 102, and is either adjustable or fitted with a rupture disc. The relief valve 102 and non-tight seal of the shut-off mechanism 36 provide just the right combination to always maintain enough flow to prevent dead head while simultaneously preventing any significant pooling upon release. Once the back pressure is reduced, the plunger 38 automatically resets the shut-off mechanism 36 to the open position by falling back to its lower position (as shown in FIG. 4).

The many advantages of this invention are now apparent. A device 10 for over-pressure protection of a storage tank 22 has a plunger 38 that automatically drives a shut-off mechanism 36 upon receiving a pressure above a predetermined threshold pressure. The plunger 38, connecting rod 40 and shut-off mechanism 36 are simple to assemble and are inexpensive to produce and maintain. The plunger 38 and shut-off mechanism 36 effectively prevent dead heading of the pump while simultaneously directing backflow to the release passage 34 and relief valve 102 to lower the pressure.

While various embodiments of the present invention have been described, it should be understood that other modifications, substitutions and alternatives can be made without departing from the spirit and scope of the invention, which should be determined from the appended claims.

What is claimed is:

1. A device for over-pressure protection of a tank during filling with a liquid, comprising:
    a main body defining a main passage with an inlet and an outlet, and defining a release passage branched from said main passage;
    a shut-off mechanism movably disposed within said main passage and defining an open position for allowing said liquid to flow from said inlet to said outlet and a closed position for at least partially blocking said flow, said shut-off mechanism including a paddle rotatably mounted within said main passage; and
    a plunger movably disposed within said release passage and connected to said shut-off mechanism for rotating said paddle between said open and closed positions, said plunger having a weight sufficient to maintain said paddle in said open position until pressure in said passage exceeds a predetermined value.

2. The over-pressure protection device of claim 1, wherein said plunger pulls said shut-off mechanism to a closed position that substantially blocks said main passage so that most of said liquid flowing from said inlet cannot flow to said outlet when said pressure is above said predetermined value, said shut-off mechanism in said closed position providing a passage for said liquid to flow to said release passage.

3. The over-pressure protection device of claim 2, wherein said main passage is connected to a feed line including a pump for pumping said liquid to said device, and wherein said shut-off mechanism in said closed position permits a sufficient amount of said liquid to flow from said inlet to said outlet to prevent dead heading of said pump.

4. The over-pressure protection device of claim 1, wherein said main body further defines two generally diametrically opposed apertures, and wherein said paddle is rotatably mounted on a pin secured within corresponding said apertures.

5. The over-pressure protection device of claim 1, further comprising a connecting rod connecting said plunger to said shut-off mechanism so that said plunger manipulates said connecting rod for rotating said shut-off mechanism.

6. The over-pressure protection device of claim 5, wherein said connecting rod includes a fin extending laterally relative to a longitudinal axis of said connecting rod, said fin being configured for abutting said paddle to push said paddle into said open position and hold said paddle in said open position.

7. The over-pressure protection device of claim 1, wherein said plunger has a size slightly smaller than an area of said release passage for maintaining a gap that permits said substance to flow past said plunger within said release passage.

8. An over-pressure protection device according to claim 1, wherein said plunger and said shut-off mechanism do not include an elastic member.

9. A device for over-pressure protection of a tank during filling with a liquid, comprising:
    a main body defining a main passage with an inlet and an outlet and defining a release passage branched from said main passage; and
    a shut-off mechanism having a paddle rotatably mounted within said main passage and being rotatable from an open position that permits liquid flow from said inlet to said outlet and a closed position that blocks most, but not all, of said flow entering said inlet from reaching said outlet while simultaneously directing a portion of said liquid flow from said outlet to said release passage.

10. The device of claim 9, further comprising a plunger disposed within said release passage and connected to said shut-off mechanism, said plunger having a weight sufficient to maintain said shut-off mechanism in said open position until pressure in said release passage exceeds a predetermined amount.

\* \* \* \* \*